2,171,971

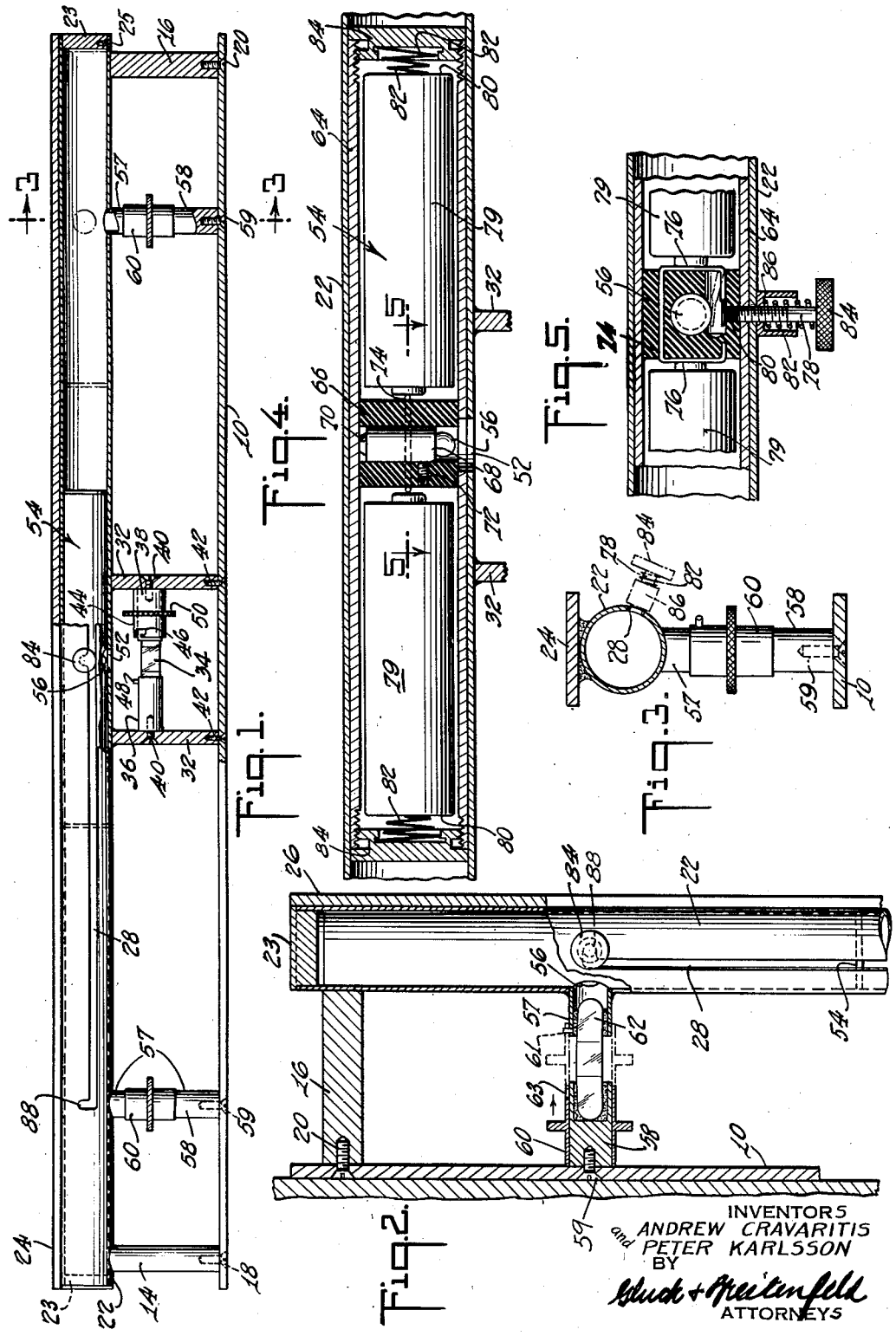
Sept. 5, 1939.  A. CRAVARITIS ET AL  2,171,971
ILLUMINATED LEVEL
Filed Dec. 7, 1937
INVENTORS
ANDREW CRAVARITIS
and PETER KARLSSON
BY
*Gluck + Breitenfeld*
ATTORNEYS Patented Sept. 5, 1939

UNITED STATES PATENT OFFICE 2,171,971

ILLUMINATED LEVEL

Andrew Cravaritis and Peter Karlsson, New York, N. Y., assignors to National Silver Deposit Ware Co., New York, N. Y., a corporation of New York Application December 7, 1937, Serial No. 178,458

6 Claims. (Cl. 240—6.44)

Our present invention relates generally to levels and, in particular, to a level provided with means for illuminating portions thereof.

One of the objects of our invention is to provide, in a level, means for illuminating such portions of the level as necessary for its effective use in places where sufficient light is not readily available.

Another object of our invention is to provide, in a level having a plurality of level glasses, an illuminating unit that is selectively adjustable into operative positions in relation to said level glasses.

A feature of our invention lies in the employment of a hollow guideway slidably accommodating an illuminating unit adapted for use in selectively illuminating various portions of the level, the guideway lying within the confines of the level as a whole.

A further object of our invention is to provide means for affording ready access to said illuminating unit, e. g., for purposes of repair or replacement.

A still further object of our invention is to provide an efficient means for protecting the level glasses when they are not in use.

It is a general object of our invention to provide a level construction in which the various parts thereof are easy to manufacture and assemble, and readily accessible for purposes of repair or replacement.

We achieve the foregoing objects, and such other objects as may hereinafter appear or be pointed out, in the manner illustratively exemplified in the accompanying drawing, wherein—

Figure 1 is an elevational view of a level constructed according to our invention, portions being broken away to expose the interior;

Figure 2 is a view similar to Figure 1, but on an enlarged scale, of one end of the level, portions being broken away to disclose the interior;

Figure 3 is a sectional view taken substantially on the line 3—3 of Figure 1;

Figure 4 is an enlarged sectional view of the upper midportion of Figure 1, taken substantially in the same direction as Figure 1; and Figure 5 is a view taken substantially on the line 5—5 of Figure 4.

Briefly, the level we have chosen to illustrate comprises a pair of parallel plane surfaces, referred to hereinafter as "standard surfaces", and adapted to be placed over or against edges or surfaces that it is desired to test. The level is provided with a level glass for leveling or horizontal work and with a pair of plumb glasses used for plumb or vertical work. Carried by the level and associated with one of the standard surfaces is an enclosed guideway within which is disposed a flashlight unit. Apertures are provided in the walls of the guideway through which light from this flashlight unit may be directed against any selected one of the level or plumb glasses so as to illuminate them. In order to provide for this selective illumination of any chosen one of the level glasses, the flashlight unit is made adjustable within the guideway.

Referring now to the drawing, it will be observed that the frame of our level comprises a member or bar 10 the outside surface of which is a smooth standard surface, and this bar is shown as being removably secured to uprights 14 and 16 in any suitable manner, such as by the screws 18 and 20. The uprights 14 and 16 project from a tubular member 22 which carries a bar 24 the outside surface of which is a second smooth standard surface.

The tubular member 22 is provided with a longitudinally extending slot 28 and with uprights 32 carrying a level glass 34 between them. The latter may have its ends supported in hollow members 36 and 38 carried by the uprights 32, and removably united thereto in any suitable manner as, for example, by the screws 40. At their other ends, the uprights 32 are secured to the bar 10 in any suitable manner, preferably by the removable screws 42.

In order to protect the level glass 34 when it is not in use, we provide a cover, preferably in the form of a sleeve 44, adapted to be positioned over the tubular member 38 and slidable into and out of protective relation to the level glass. In order to provide for locking the sleeve 44 in its protective position, we provide a means such as the bayonet slot 46, this slot being engageable with a pin 48 projecting from the tubular member 36. For convenient manipulation of the sleeve 44 we provide a means such as the flange 50 which, for additional convenience, may be knurled at its periphery as shown in the drawing.

To provide illumination for the level glass 34 we provide the tubular member 22 with an opening or aperture 52 in line with the exposed portions of the level glass 34; and within the tubular member 22 we mount a flashlight unit designated by the general reference numeral 54. This unit includes a bulb 56 which may be positioned so that its light shines directly on the level glass 34. This position of the light is shown in Figure 1.

At 23 we have shown end closures for the tubular member 22, serving to retain the flashlight unit in the guideway and also protecting it. The closures or end walls 23 are preferably in the form of caps removably held in place by screws 25. In view of the ease with which these closures may be removed, ready access may be had to the flashlight unit, which can be bodily removed from the tubular casing, as will be more fully explained hereinafter.

Near each end of the level is shown a level glass 62, disposed transversely to the level so as to adapt the level for plumb work; and each glass 62 has one of its ends supported by a tube 57 carried by the tubular member 22. A second supporting member 58 for each glass 62 is secured to the bar 10 in any suitable manner, preferably by the removable screw 59. A slidable cover similar to the cover 44 (described in connection with the level glass 34) is shown at 60, the details thereof being identical with those of the cover 44. Pins 61 are shown for locking the covers 60 in their protective positions when inserted into the bayonet slots 63 of the covers.

In Figure 2 the bulb 56 of the flashlight is shown positioned in registration with one of the tubes 57, and it will be observed that the light is directed endwise into the plumb glass 62 for illuminating the same.

It will now be apparent that by providing removable connections, such as the screw connections 18, 20, 40, 42, 59, the level glasses and the parts associated therewith are readily replaceable when necessary. For instance, by removing the bar 10, the covers 60 may be removed or inserted, as well as the level glasses 62; and by removing the screws 40, the level glass 34 may be removed.

The details of the flashlight and its mountings will now be described.

In Figures 3, 4 and 5 we have shown a flashlight unit 54 in the form of a tube 64 slidable within the tubular member 22; and it will be observed from Figure 4 that the fit is made close enough to prevent undesirable lost motion such as might cause rattling of the parts and, further, to assure proper electrical contacts. At the middle of the tube 64 is shown an insulating block 66 provided with a bore within which the flashlight bulb 56 is accommodated. The bulb may have a base with an outer conducting sleeve 68 constituting one terminal of the bulb and carries at its end, in insulated relation, the other terminal 70. The bulb is held in place by a means such as the set screw 72, so that the terminal 70 contacts with the tube 64 which is of electrically conductive materal.

An electrical conductor 74, preferably in the form of an open loop, is carried by the block 66 and has portions exposed so as to contact with the inner terminals 76 of a pair of dry cells 79 positioned one on each side of the block 66. The other or outer terminals of the dry cells, constituted in the ordinary dry cell by the outer zinc linings 80, are electrically connected to the tube 64, and thereby to the terminal 70 of the bulb, by compression springs 82 made of conducting material and carried by caps 84 serving to close the ends of the tube 64. By this arrangement resilient pressure is provided by means of which proper contact is obtained between the terminals of the dry cells and the parts that it is desired to energize.

By referring to Figure 5, it will be noted that the conductor 74 has one free end movable into or out of contact with the cylindrical base 68 of the bulb 56; and movement of this free end may be effected by an adjusting member 78 which is shown, by way of example, in the form of a screw in threaded engagement with the tube 64, whereby it may be moved into or out of the tube. Intermediate the member 78 and the terminal of the conductor 74 is an insulating block 80, this being desirable to prevent a short circuit between the parts 74 and 64 which are connected, respectively, to opposite terminals of the dry cells. By screwing the member 78 inward, the end of the conductor 74 will make contact with the base 68 of the bulb, and this will close the bulb circuit.

A coil spring 82 is preferably positioned between the head 84 of the member 78 and the base of a cup-shaped member 86 and serves to press the cup-shaped member 86 against the outer wall of the tubular member 22, thereby always holding the screw 78 under pressure against the tube 64 and preventing undesired accidental displacement thereof.

Besides serving as a switch handle, the member 78 serves as a convenient means for adjusting the position of the flashlight unit in the casing 22. In fact, it is the only means for so doing, since the other parts of the flashlight unit are located within the confines of the casing 22 by which they are protected.

In order to locate the bulb 56 in the correct relation to the respective level glasses, we prefer to provide cross slots or recesses 88 merging into the longitudinal slot 28 at points opposed to the various level glasses; and the member 78 is positioned at such an angle in relation to the bulb 56 that when it is slid into the cross slots, the bulb will be properly positioned so as to direct its light either into the tubes 57 of the plumb glasses or through the opening 52 against the level glass 34. By this arrangement of slots, the correct adjustment of the flashlight unit may be effected solely by the sense of touch and without any need for outside illumination.

In the operation of our level, the head 84 of the member 78 is used to move the flashlight into the desired position in relation to the particular level glass to be used; and thereafter the light may be turned on by suitable operation of the head 84. It will be observed that when the light is thrown on, greater tension is put on the spring 82, so that a form of locking effect is secured, serving to lock the flashlight unit in place. Thereafter the covers 44 or 60 are slid aside so as to expose the desired level glass; and the level is then used in the customary manner of putting a standard surface against the surface or edge to be tested.

When it is desired to have access to the flashlight unit, all that is necessary is to unscrew the switch rod 78 and to remove one of the caps 23, after which the flashlight unit may be slid bodily out of the casing 22.

From the preceding description, it will be apparent that we have provided a highly convenient and workmanlike construction in which all parts are readily accessible and are adequately protected against damage.

In general, it will be understood that changes in the details, herein described and illustrated for the purpose of explaining the nature of our invention, may be made by those skilled in the art without departing from the spirit and scope of the invention as expressed in the appended claims. It is, therefore, intended that these details be interpreted as illustrative and not in a limiting sense.

Having thus described our invention and illus- trated its use, what we claim as new and desire to secure by Letters Patent is—

1. In a level, a bar adapted to be applied to the surface to be tested, a series of spaced level glasses carried thereby, a tubular member arranged above said bar in parallel relation thereto, said member being provided with a longitudinal slot and also with apertures aligned with said level glasses respectively, a flashlight unit slidably mounted in its entirety within said tubular member and provided with a bulb adapted to register with any selected aperture and thereby illuminate the corresponding level glass, and a handle projecting transversely from said unit through said slot to afford an externally-accessible means for controlling the sliding movements of said unit.

2. In a level, the combination set forth in claim 1, said handle comprising a switch button for said flashlight unit.

3. The combination with the elements set forth in claim 1, of a removable end wall for said tubular member to permit endwise insertion and withdrawal of the flashlight unit.

4. In a level, the combination set forth in claim 1, said handle being removably secured to said unit, and said tubular member being provided with a removable end wall, whereby said unit with the handle removed may be inserted and withdrawn endwise into and from said tubular member.

5. In a level, a pair of parallel bars either of which is adapted to be applied to the surface to be tested, a series of spaced level glasses carried by said bars in the space between them, a tubular member mounted on the inside surface of one of said bars in parallel relation thereto, said member being provided with a longitudinal slot and also with apertures aligned with said level glasses respectively, a flashlight unit slidably mounted in its entirety within said tubular member and provided with a bulb adapted to register with any selected aperture and thereby illuminate the corresponding level glass, and a handle projecting transversely from said unit through said slot to afford an externally-accessible means for controlling the sliding movements of said unit.

6. In a level, the combination set forth in claim 1, said slot having transverse recesses adapted to accommodate said handle, said recesses being so positioned that when the handle is moved into any recess the bulb of the flashlight unit is accurately in registry with one of said apertures.

ANDREW CRAVARITIS.
PETER KARLSSON.